US005277736A

United States Patent [19]

Logan

[11] Patent Number: 5,277,736

[45] Date of Patent: Jan. 11, 1994

[54] AUTOMATIC WEEDING SYSTEM AND METHOD OF USE

[75] Inventor: David J. Logan, Bloomfield, Conn.

[73] Assignee: Gerber Scientific Products, Inc., Manchester, Conn.

[21] Appl. No.: 895,929

[22] Filed: Jun. 9, 1992

Related U.S. Application Data

[62] Division of Ser. No. 566,123, Aug. 10, 1990, Pat. No. 5,143,576.

[51] Int. Cl.$^5$ .............................................. B32B 31/00

[52] U.S. Cl. .................................... 156/247; 156/248; 156/250; 156/267; 156/268; 156/344

[58] Field of Search ............... 156/290, 291, 247, 248, 156/268, 250, 251, 257, 260, 267, 269, 265, 351, 344, 353

[56] References Cited

U.S. PATENT DOCUMENTS

| | | | |
|---|---|---|---|
| 2,591,779 | 4/1952 | Buck | 156/247 |
| 2,907,682 | 10/1959 | Eichel | 33/18 R |
| 3,297,508 | 1/1967 | Jahp | 156/249 |
| 3,445,268 | 5/1969 | Heichlinger | 156/344 |
| 3,741,786 | 6/1973 | Torrey | 156/344 |
| 3,785,898 | 1/1974 | Gerber et al. | 156/353 |
| 4,425,176 | 1/1984 | Shibano et al. | 156/344 |
| 4,444,078 | 4/1984 | Pearl | 83/394 |
| 4,448,808 | 5/1984 | Pearl | 427/208.6 |
| 4,460,634 | 7/1984 | Hasegawa | 156/344 |
| 4,467,525 | 8/1984 | Logan et al. | 33/18 R |
| 4,512,839 | 4/1985 | Gerber | 156/268 |
| 4,544,430 | 10/1985 | Shepherd | 156/344 |
| 4,718,963 | 1/1988 | Pöll et al. | 156/344 |
| 4,732,069 | 3/1988 | Wood et al. | 83/881 |
| 4,759,816 | 7/1988 | Kasper et al. | 156/344 |
| 4,824,498 | 4/1989 | Goodwin et al. | 156/344 |
| 5,026,584 | 6/1991 | Logan | 428/40 |
| 5,116,439 | 5/1992 | Raus | 156/344 |

*Primary Examiner*—David A. Simmons
*Assistant Examiner*—William J. Matney, Jr.
*Attorney, Agent, or Firm*—McCormick, Paulding & Huber

[57] ABSTRACT

A system automatically weeds around graphics cut into a sheet of sign material having a backing and utilizes a tool moved relative to the sign material sheet along a path offset from the lines of cut defining the graphic in response to commands issued by a controller to selectively bond an overlay sheet to the weed portions of the sign material sheet. The overlay sheet is placed over the sign material sheet and is selectively bonded with portions of the cut sign material sheet for subsequent separation of the nongraphic or weed material from the cut graphic when the overlay sheet is pulled away from the backing.

15 Claims, 8 Drawing Sheets

AUTOMATIC WEEDING SYSTEM AND METHOD OF USE

This is a divisional of co-pending application Ser. No. 07/566,123 filed on Aug. 10, 1990, now U.S. Pat. No. 5,143,576.

CROSS REFERENCE TO RELATED APPLICATIONS

The present invention relates to copending U.S. Ser. No. 056,458, entitled SIGN MAKING WEB WITH DRY ADHESIVE LAYER AND METHOD OF USING THE SAME filed on May 29, 1987 in the name of the same inventor of the present invention and being commonly assigned therewith.

BACKGROUND OF THE INVENTION

The present invention resides in a system wherein graphics are automatically cut into a sheet of sign material continuously fed through an automated cutting apparatus and more particularly resides in a means and method provided in the system by which the cut sign material sheet is automatically weeded such that portions of the sign material sheet not comprising the cut graphic may be readily peeled away from graphic thus avoiding the practice of hand weeding.

Creating graphics in a web of sign material by cutting into it letters or other shapes has been significantly aided by automated sign generating systems such as disclosed in U.S. Pat. No. 4,467,525 issued to Logan et. al on Aug. 28, 1984, which patent being commonly assigned with the assignee of the present invention. These automated sign making machines permit the rapid composition of sign characters and logos in a variety of fonts, character sizes, spacing, arrangements and appearances selected by the user according to the desired message to be made. Additionally, these machines recall from memory preprogrammed designs directing movements of an automated coordinate controlled cutting tool over the sign material sheet to effect rapid cutting of the desired graphic into the sign material sheet. The designs and letters which comprise the graphic cut into the sign material sheet are not strictly closed shapes, such as found with the letters "J" or "L", but rather involve shapes that have openings cut in them to further define the character or shape being created, such as with the letters "O" or "P". Thus, it becomes apparent that despite the rapidity which these shapes can be cut by the machine in the sign material sheet, mass producing these shapes in final form is nonetheless limited by the hand weeding process.

Hitherto, weeding of sign material from around and within the graphic cut in the sign material sheet was usually done by hand utilizing a pair of tweezers to lift an edge of the material away from a base or liner sheet material on which the sign material sheet is carried. Since the sign material sheet and the base layer are loosely bonded with one another by a layer of low tack adhesive, the process of hand weeding can become particularly tedious especially in light of the very thin sign material sheet thickness which must be separated from the associated base layer. Notwithstanding this, weeding of the unwanted sign material from the cut graphic while the graphic is still bonded to the base layer sheet is necessary in order to allow the component parts of the graphic to be maintained in the same spatial relationship with which they were originally cut. Since the variously different sized and shaped pieces which may comprise a particular graphic are precisely arranged by the machine according to a computerized program, it is important that the original layout of the graphic is not disrupted so that it may subsequently be directly applied to the sign surface in the same spatial relationship in which it was produced by the machine.

It is therefore an object of the present invention to provide an automated weeding system of the type wherein a graphic is automatically cut in a sheet of sign material such that sign material not included as part of the cut graphic is automatically weeded from the underlying base layer thus avoiding manual weeding of the sheet material from in and around the cut graphic.

It is a further object of the present invention to provide an automatic weeding system of the aforementioned type wherein differently sized and shaped graphics may be cut from a sheet of sign material and subsequently automatically weeded regardless of the variations in character shapes or patterns cut into the web.

It is yet a further object of the present invention to provide an automatic weeding system of the aforementioned type wherein the sheet of sign material comprising the cut graphic remains bonded to a base sheet in the same orientation and arrangement as originally cut by the system such that the unwanted sign material is readily removed from within and around the cut graphic by an overlay sheet automatically bonded to the weed portions of the sign material sheet.

A further object of the present invention is to provide a method for automatically weeding portions of the sheet of sign material from the underlying base layer upon which the sign material sheet is bonded by utilizing the vectors responsible for originally cutting the graphic to selectively bond unwanted portions of the sign material sheet with an overlay sheet for subsequent removal of the weed.

Still a further object of the present invention is to provide a method whereby differently sized and shaped graphics formed in the sheet material may be left on the underlying base layer while the remaining non-graphic material is pulled away from the underlining base layer by an overlay sheet provided with means for separating graphic and non-graphic material from the base layer.

Other objects an advantages of the present invention will be apparent from the following description and the drawings and from the appended claims.

SUMMARY OF THE INVENTION

The present invention resides in an automatic weeding system and method wherein a web of sheet material fed into a sign generating machine generating sign text in the form of a graphic or logo is subsequently worked on by the machine to bond portions of the sheet material not otherwise comprising the graphic to an overlay sheet thus effecting automatic weeding around the cut graphic for subsequent application onto a sign surface.

For this, the apparatus includes a support surface for supporting the sheet material during a cutting operation and includes advancing means having two spaced apart sprockets with associated clamps for advancing the sheet material across the support surface. The advancing means is capable of receiving in registry therewith the sign material sheet on which is formed the generated sign text and the overlay sheet placed in confrontation with the upper surface of the sheet material during the weeding operation such that the two layers move in registry with one another through the machine. Means are provided for suspending a tool means for movement over the support surface upon which surface the sheet material is moved in coordinated movements with the movements of the tool means. The tool means is comprised of both a cutting implement for cutting the sign material sheet to generate the desired graphic and a tool movable over the support surface for selectively bonding the overlay sheet to the non-graphic areas placed in confrontation with it. The tool means may also comprise a tool assembly having both a cutting tool with a depending tip defining a penetrable depth and an offset pressure foot, the thickness of the overlay sheet being selected such that it is substantially greater than the penetration depth of the cutting tool.

The sign material sheet is a web of soft cuttable plastic or like material having an upper surface facing upwardly toward the tool means and having its opposite lower surface facing a base or linear sheet, with the sign material sheet lower surface and the base sheet upper surface being releasably attached with one another by a layer of permanently tacky adhesive. In one embodiment of the invention, the upper surface of the sign material sheet comprises the good or sign surface and the layer of permanently tacky adhesive is bonded more strongly to the lower surface of the sign material sheet than to the upper surface of the liner material sheet. With this arrangement, a bonding material capable of being activated by the tool means is formed on the lower surface of the overlay sheet and is selectively activated to bond the overlay sheet with the non-graphic portions of the sign material sheet when it is placed in confrontation with the sign material sheet and subsequently acted on by the tool means. The bonding means here is comprised of microencapsulated adhesive activated into a tacky condition by the application of downward pressure on the upper surface of the overlay sheet. Alternatively, the bonding material may take the form of a dry activatable adhesive layer formed on the upper surface of the sign material sheet having an opposite lower surface defining the sign surface releasably attached to the base layer by a pressure sensitive or permanent tacky layer of adhesive. Since the sign material sheet here carries the adhesive necessary for weeding the non-graphic portions of the sign material sheet, the overlay sheet is thus comprised of a single sheet having no adhesive. The dry activatable adhesive may be chemically activated and subsequently bonded with the overlay sheet after a chemical activator is applied to the upper surface of the overlay sheet.

For moving the tool means along a path over the bonding material to effect selective activation of it, the controller utilizes memory means to cause the tool which activates the bonding material to move it along a path just slightly offset from the cut lines defining the graphic. For this purpose, the machine stores vectors and data defining font characters in terms of strokes in the memory means to subsequently move the tool along the offset path. The adhesive strength of the activated bonding material interposed between overlay sheet and the sign material sheet is substantially greater than that of the layer of permanently tacky adhesive interposed between the sheet of base material and the sign material sheet such that the non-graphic portions of the sign material sheet are capable of being lifted off the liner with the overlay sheet when the overlay sheet is pulled away from it.

The method of automatically weeding sign material in and around a graphic cut in a web of sign material comprises in the preferred embodiment, providing a sign material sheet having an upper surface and an opposite lower surface with the lower surface of the sign material sheet being releasably attached to a base sheet by a layer of low tack adhesive. Lines are cut in the sign material sheet to create a graphic. An overlay sheet is provided having an upper surface and an opposite lower surface for selectively attaching and pulling away non-graphic portions of the sign material sheet. Bonding material capable of being activated in part from an inert state to a tacky activated state are provided. The overlay sheet is placed on the sign material sheet so that the overlay sheet becomes bonded to the non-graphic portions of the sign material sheet. Subsequently, the overlay sheet and the sign material sheet are pulled from the base sheet to remove the weed portions of the sign material sheet surrounding the cut graphic.

DETAILED DESCRIPTION OF THE PREFERRED EMBODIMENTS

Figure 1:
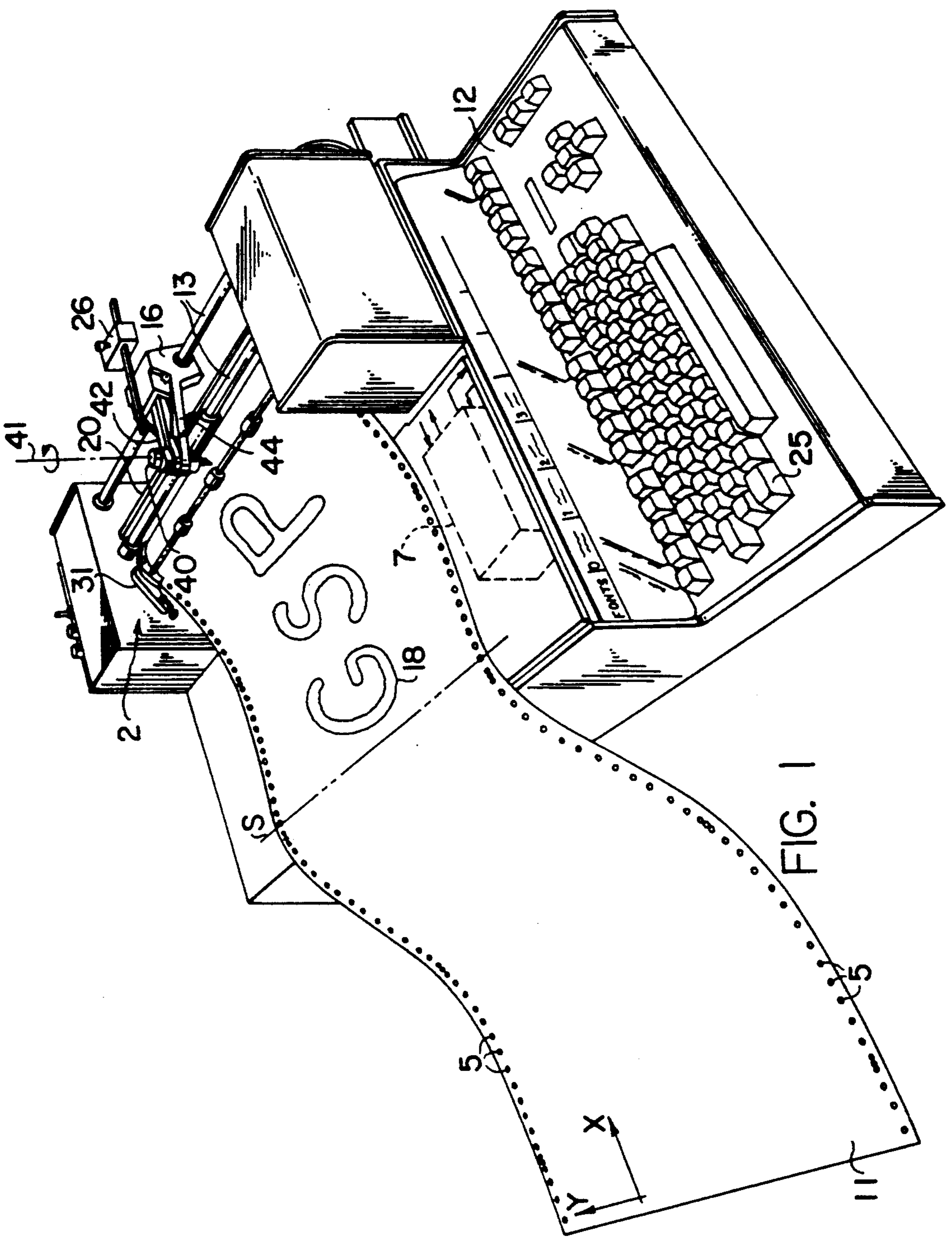
FIG. 1 is a perspective view illustrating the sign generating apparatus employed by the present invention.

Referring now to FIG. 1, a sign making machine 12 is illustrated for handling and working on an associated web 11 of laminated sheet material. The web 11 is moved through the machine 12 longitudinally of itself in the illustrated X coordinate direction by material advancing or means 2 across a work surface defined by a roller 20. A tool head is supported and driven by appropriate motor means (not shown) in the illustrated Y coordinate direction on a way 13 extending transversely relative to the web 11. The machine 12 further includes a controller 7 having a microprocessing unit linked to a memory means and a keypad interface 25 for instructing the controller 7 to move the web 11 relative to the tool head 16 to cause a graphic 18 to be formed in the web 11.

Figure 2:
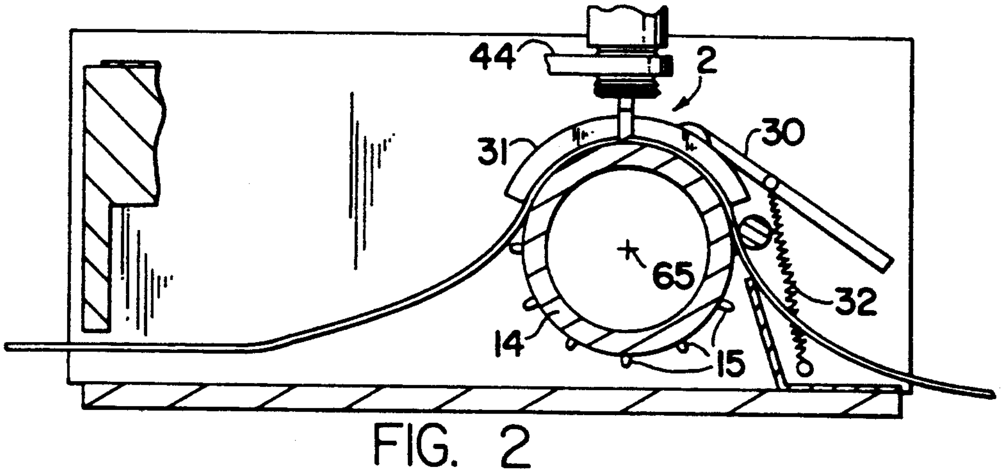
FIG. 2 is a cross sectional view showing the tool head and the material advancing mechanism employed in the apparatus of FIG. 1.

Referring now to FIG. 2 and in particular to the advancing means 2 used for controlled movement of sections of sheet material through the machine 12, it will be seen that the advancing means includes two sprockets 14,14 rotatably driven by appropriate motor means about a common axis of rotation 65 in response to instructions issued by the controller 7. The sprockets 14,14 are spaced apart from one another by approximately the width of the web 11 and have a series of circumferentially disposed teeth or pins 15,15 projecting radially outwardly from the axis 65. The pins 15,15 are received within a series of openings 5,5 extending along either side edge of the web 11 in order to effect positive movement of the web 11 through the machine 12. Each of the sprockets has an associated arcuate clamp 31 joined with a pivotal support arm 30 biased toward the sprocket by a spring 32 drawing the clamp against the sheet material being pulled through the machine 12. The arcuately shaped guide clamps 31,31 each have an arcuate groove straddling the sprocket pins allowing the pins 15,15 to rotate through the clamps while nevertheless allowing each clamp to apply the hold down force necessary to keep the sheet material in registration with the sprockets.

The tool head 16 carries a tool holder 40 and an associated tool rotatable relative to the head about an axis 41 oriented substantially vertically when the tool head is in the working position above the web 11 as illustrated in FIG. 1. To effect rotation of the tool holder 40 about the axis 41, a drive belt 42 is employed to rotatably couple the tool holder 40 to a motor carried by the tool head 16 responsive to commands issued by the controller 7. The tool head is pivotally mounted on the carriage 13 such that the tool holder 40 is cantilevered outwardly therefrom by an arm 44 allowing the holder and its associated tool to be normally urged downwardly toward the web 11 by gravity. For adjusting the amount of downward force, a counterweight 26 is provided for varying the amount of downward pressure applied to the sheet material passing beneath the tool holder.

Figure 3:
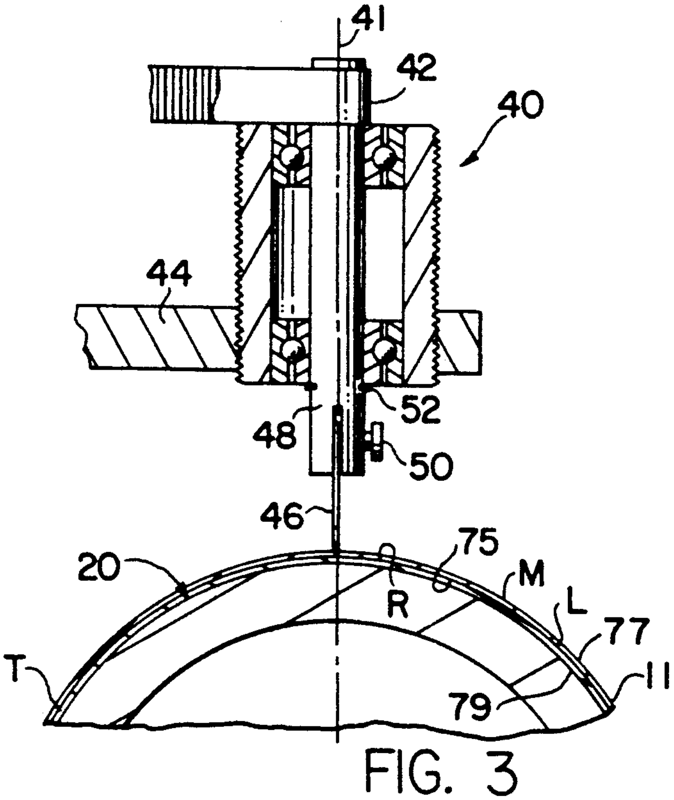
FIGS. 3 is a side elevation view partially in section showing a knife blade tool and its associated support arm shown in FIG. 2.

As can be seen from the illustrative example in FIG. 3, the tool holder 40 has a chuck 48 for holding a cutting tool 46 for movement above the web 11 at the apex of the roller 20. In this illustrative example, the cutting tool 46 is a small scapula blade having a sharp cutting edge at its depending end and is clamped to the chuck 48 by means of a clamping screw 50 at its generally flat upper end. The chuck 48 and the associated cutting tool 46 are prevented from moving axially upwardly relative to the arm 44 by a detent ring 52 received within a circumaxial groove formed in the chuck 48. In the illustrated example of FIG. 3, the chuck 48 is shown rotatably coupled by the belt 42, but may alternatively be freely rotatable about the tool axis 41 such that it is capable of repositioning itself along a line of cut as the directional movement of the web 11 is changed.

As will be discussed in greater detail later with reference to table A-1 below, the web 11 may be comprised of a sheet of sign material M and an underlying liner or base sheet L adhered to it. Each sheet has a relative thickness such that the materials allow the blade 46, with the appropriate adjustment of the counterweight 26, to cut the sheet material M while nevertheless only slightly scoring the liner L. To this end, the sign material sheet M has a cuttable upper sign surface 77 facing the tool head 16 and has an opposite lower surface 75 facing the liner sheet material L. The liner sheet material has an upper release surface R and an opposite lower surface 79 supportedly engaged by the roller 20. Interposed between the sign material sheet M and the liner sheet material L is a layer T of pressure sensitive adhesive or permanently tacky adhesive releasably adhered to the release surface R of the liner sheet L, yet more strongly bonded to the lower surface 75 of the sign material sheet M. The adhesive layer T is however sufficiently strong enough to bond the cut graphic to a substrate surface in a manner consistent with that disclosed in the aforementioned U.S. Pat. No. 4,467,525 issued to Logan et al.

Figure 4:
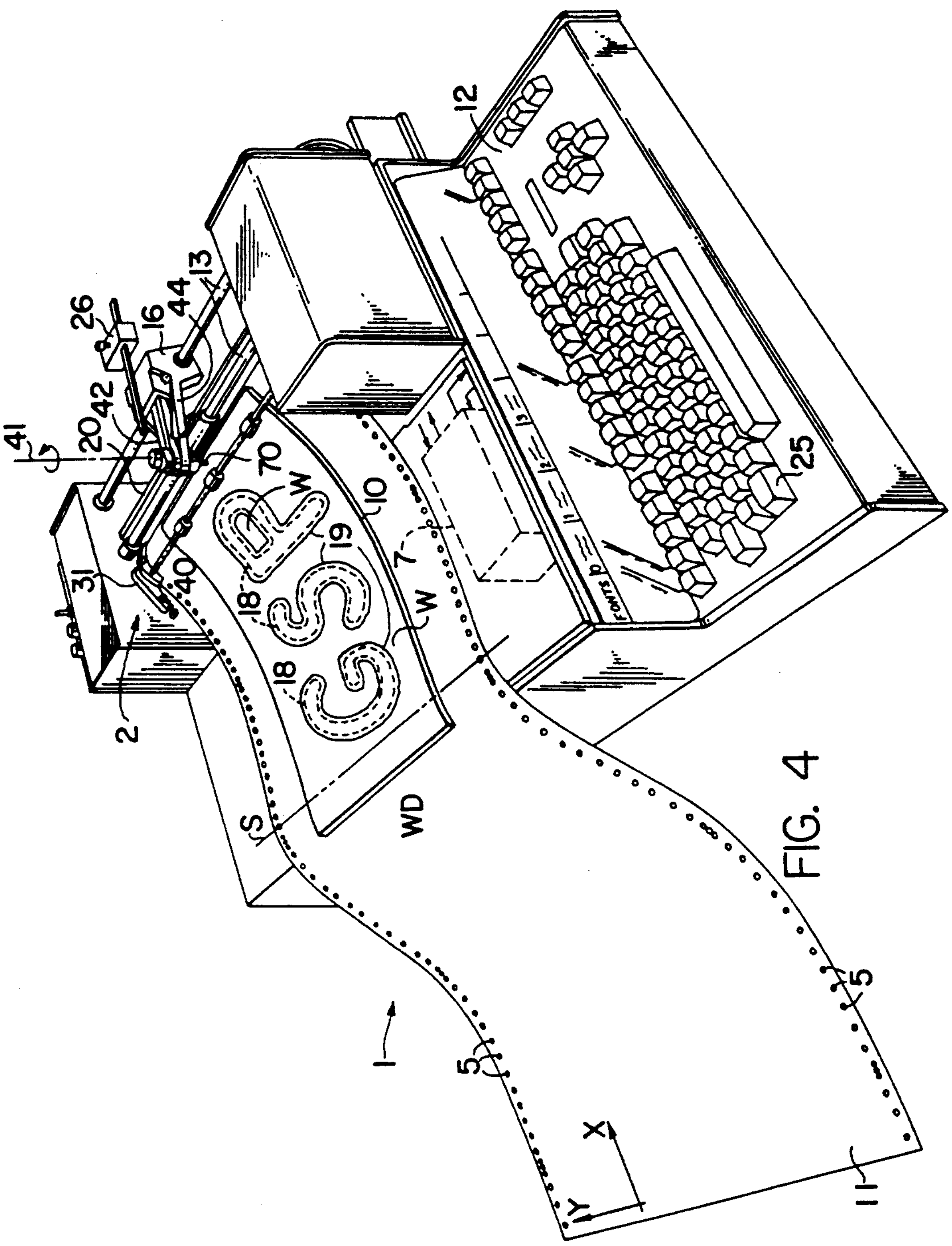
FIG. 4 is a perspective view illustrating the automatic weeding system embodying the present invention.

In accordance with the invention, an automated weeding system indicated generally as 1 in FIG. 4 is employed for readily removing weed portions W of the sign material sheet M from around and within the graphic 18 cut in it. The system 1 includes the aforementioned machine 12 which initially cuts the graphic 18 into the web 11, an overlay sheet 10 having means for placing it in registration with the cut web 11, a means 70 carried by the tool holder 40 for selectively bonding the overlay sheet 10 with portions of the sheet material M and a means within the controller 7 for causing the means 70 to follow a path slightly offset from the cut lines defining the graphic 18.

Figure 5:
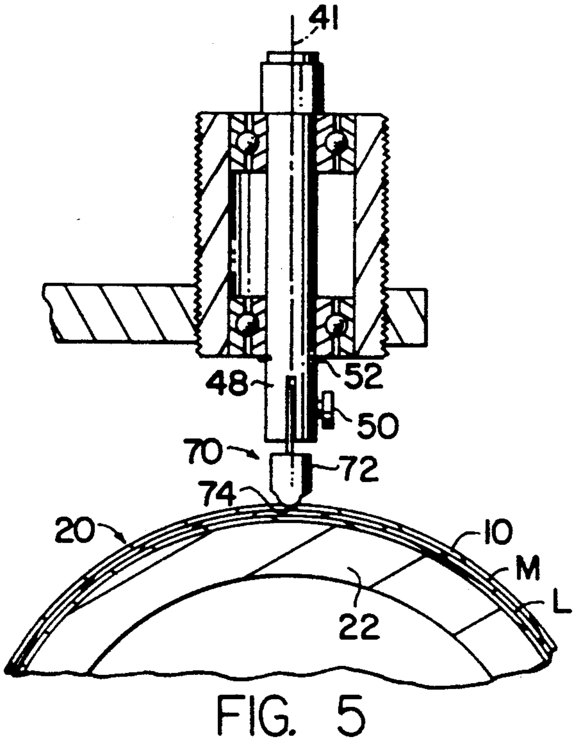
FIG. 5 is a side elevation view partially in section showing a pressure tool mounted in the support arm in place of the cutting tool of FIG. 3.
Figure 6:
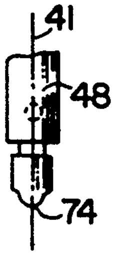
FIG. 6 is a fragmentary side elevation view of the pressure tool of FIG. 5 shown from another side.

In one embodiment of the invention, as shown in detail in FIGS. 5 and 6, the means 70 includes a pressing tool 72 having a depending tip 74 for engaging with the overlay sheet 10 to press it into bonding relationship with the underlying sign material sheet M in a manner that will be hereinafter become apparent. The pressing tool 72 at its upper end is sized to be received within the chuck 48 and may readily replace the cutting tool 46 by loosening the clamping screw 50 and reinserting the pressing tool 72 in its place.

Figure 7:
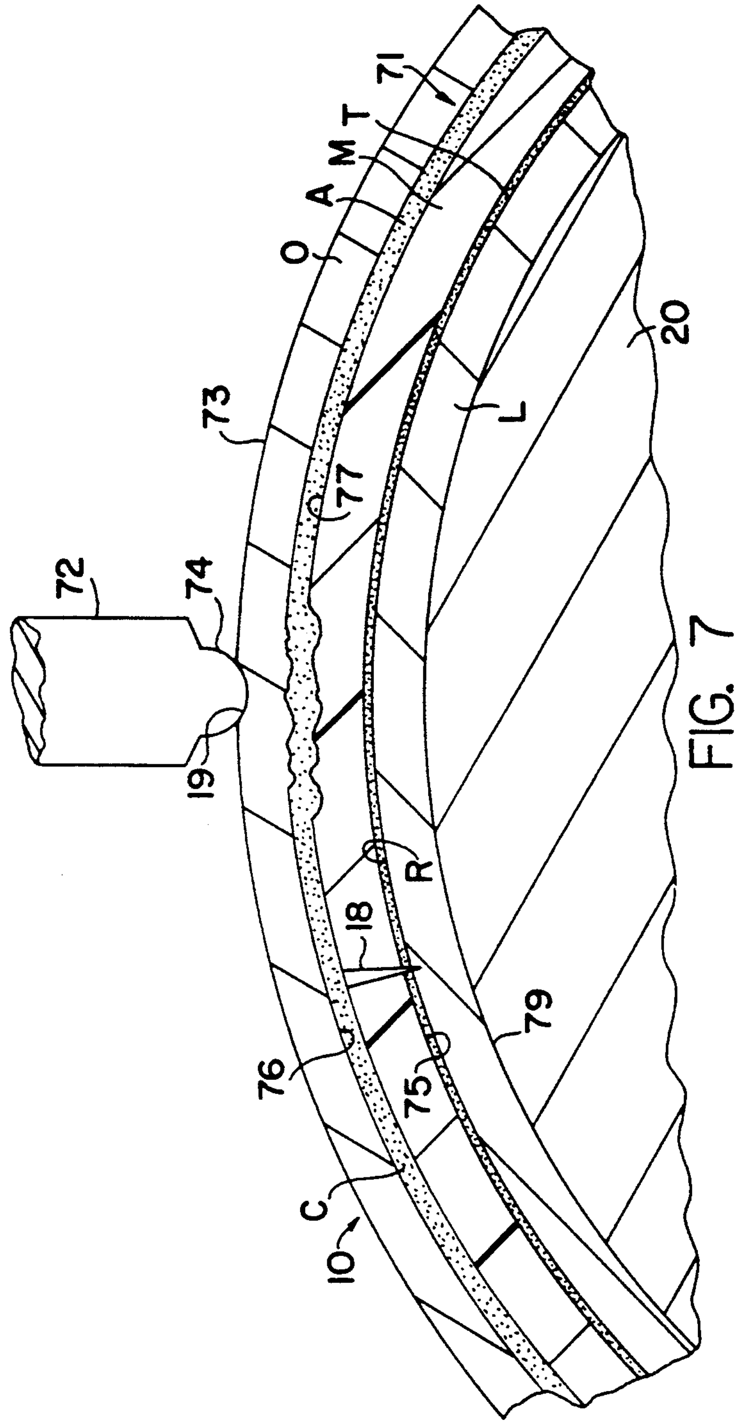
FIG. 7 shows in side elevation view a pressing tool in contact with the overlay sheet and the sign web being supported on a fragmentary vertical section view of the support roller.

Interposed between the overlay sheet 10 and the web 11 is a bonding material 71 for selectively bonding to the overlay sheet 10 portions of the sign material sheet M directly underlying the tip 74 of the pressure tool 72. For this purpose, the overlay sheet 10 as illustrated in FIG. 7 may be comprised of a backing material O, preferably inexpensive paper having an upper surface 73 facing the tool 72 and an opposite lower surface 76 having a tacky adhesive layer A bonded to it. The adhesive layer A is a generally low tack adhesive with enough strength to hold the backing material O in place on the sign material sheet M. Here it should be understood that the adhesive layer A allows overlay sheet 10 to be held in registration with the web once it is placed onto the web for unitary movement therewith through the machine 12 as will hereinafter become apparent. Embedded within the adhesive layer A however are a plurality of hollow microspheres C, within each is encapsulated a much stronger adhesive. Alternatively, each microsphere could contain a catalyst for activating the otherwise low tack adhesive layer A into an enhanced holding adhesive. In the preferred embodiment of the invention however, the microspheres C contain a separate stronger adhesive and are of the type commercially available through the 3M Corporation having an 80% total weight payload fill of adhesive and a 20% total weight content comprised of shell.

The microspheres C are particularly well adapted for the purpose of automatic weeding because the microspheres C are crushable under the pressure tool 72 to effect enhanced bonding between the sheets O and M in regions exclusively beneath the tip 74 as can be appreciated from FIG. 7. The relative adhesive bonding strengths and material thicknesses involved are selected such that the graphic 18 will remain adhered to the liner L while the weed portions W comprising the remaining sign material sheet M are pulled away with the overlay sheet 10 as will be discussed in greater detail with reference to FIG. 9. The following table lists for purposes of illustration, characteristics of exemplary material types capable of carrying out the method associated with the automated system 1 embodying the present invention.

TABLE A-1

| SHEET MATERIAL CHARACTERISTICS | | |
|---|---|---|
| ELEMENT | THICKNESS (INCHES) | MATERIAL |
| M | 0.003–0.004 | Soft polyvinyl-chloride |
| L | 0.012–0.015 | 90 pound paper |
| O | 0.007–0.008 | 60 pound paper |

| ADHESIVE CHARACTERISTICS | | |
|---|---|---|
| ELEMENT | MATERIAL | PEEL STRENGTH GRAMS/IN |
| T | Rubber based permanent tacky or pressure sensitive | 40–50 |
| C | Microcapsules 15–120 microns | 400–500 |
| A | Rubber based permanently tacky or pressure sensitive | 15–20 |

Figure 8:
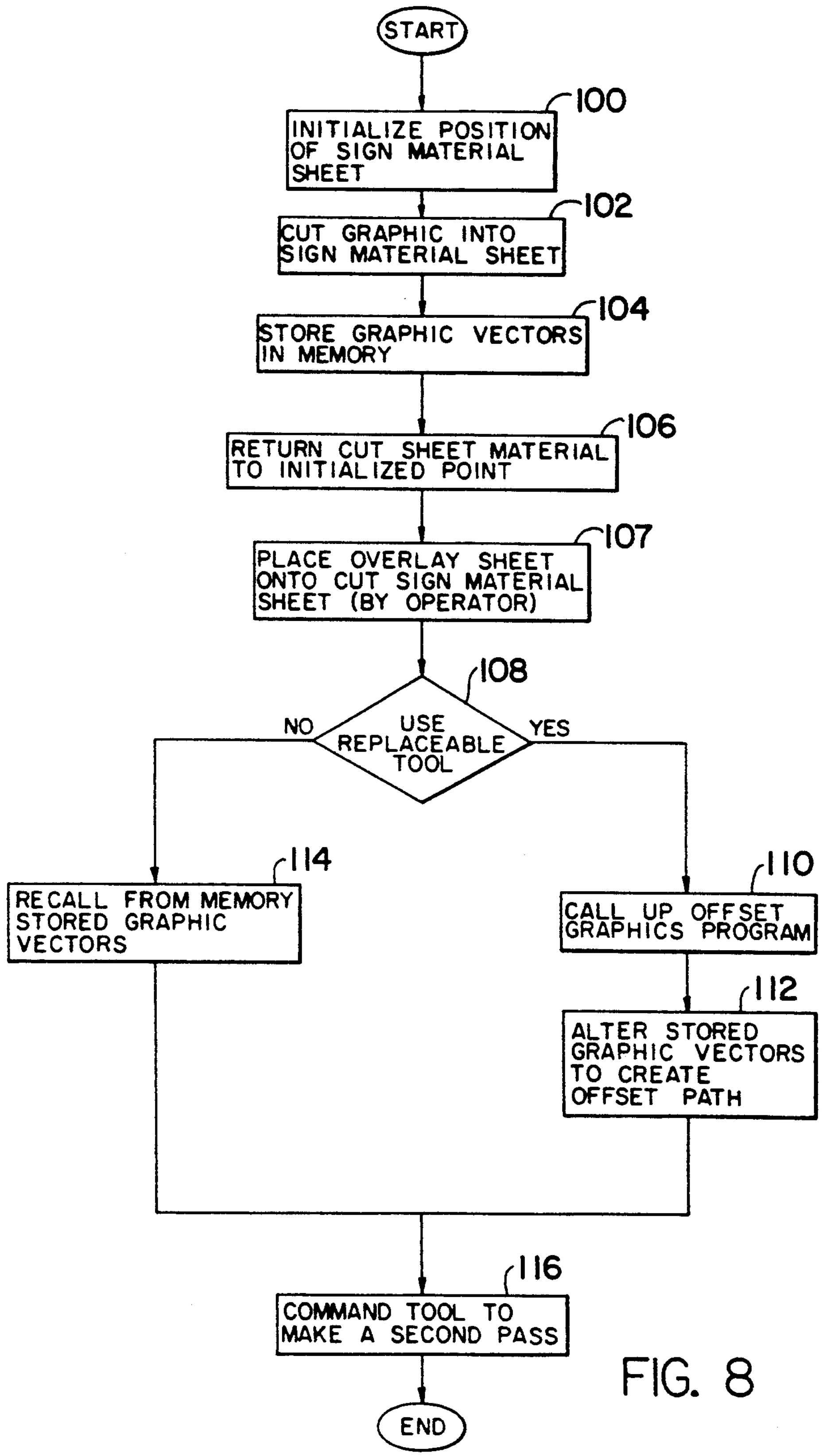
FIG. 8 is a flowchart of the program followed by the controller for accomplishing the weeding process.

Referring now to FIG. 8 and to the manner in which the automatic weeding system 1 operates, it should be seen that the controller 7 determines a point along the length of the web 11, illustrated as position S in FIG. 4, for the purpose of moving the web in either direction relative to it. Here the point S coincides with the place where the cutting tool begins cutting the graphic 18 into the web 11 (step 100). In so doing, the cutting tool 46 is made to follow a preprogrammed first path along the web 11 to cut the graphic 18 into the sign material sheet M (step 102) in the manner discussed previously with reference to FIG. 1. The vectors used in creating the involved graphic 18 are stored in memory (step 104) for later use. Once the graphic is cut, the controller 7 then instructs the material advancing means 2 to reverse the direction of the web 11 to position the initialization point S in registry with the cutting tool 46 (step 106). While maintaining registration of the web 11 with the sprockets 14,14, the overlay sheet 10 is placed down on the sign material sheet M (step 107) such that it completely covers the graphic 18 cut into the sign material sheet M. Since the overlay sheet width WD is shorter than that of the web 11, by for example approximately 2 inches, it does not interfere with the advancing means sprockets 31,31 thus allowing the adhesive layer A to maintain both the web 11 and the overlay sheet 10 in registration with one another for unitary movement through the machine 12.

With the overlay sheet 10 now in place and the pressure tool 72 substituted for the cutting tool 46, the controller 7 causes the pressure tool 72 to follow a second path 19 along the upper surface 73 of the sheet O slightly offset from the cut lines defining the pattern 18 made in the web 11 as shown in phantom line in FIG. 4. For this purpose, the controller 7 recalls from memory, a standard offset software program (step 110) and uses it to alter the basic vectors from which the graphic 18 was originally cut (step 112) thereby causing the tool 72 to be moved along the second path 19. Where letters or other shapes having openings are involved, such as in the case with the letters "P" and "O", the tool 72 follows a path just slightly inwardly offset from the interior perimeter defining the opening. Otherwise, the pressure tool 72 is moved about the outer perimeter of the graphic 18 outwardly offset from the cut lines defining the graphic 18. In so doing, the tool 72 crushes selected ones of the underlying microcapsules C embedded in the adhesive layer A during its second pass over the web 11 (step 116) thus bonding the overlay sheet 10 to the weed portions W of the sign material sheet M in the region B just below the path 19 as best illustrated in FIG. 7.

Figure 9:
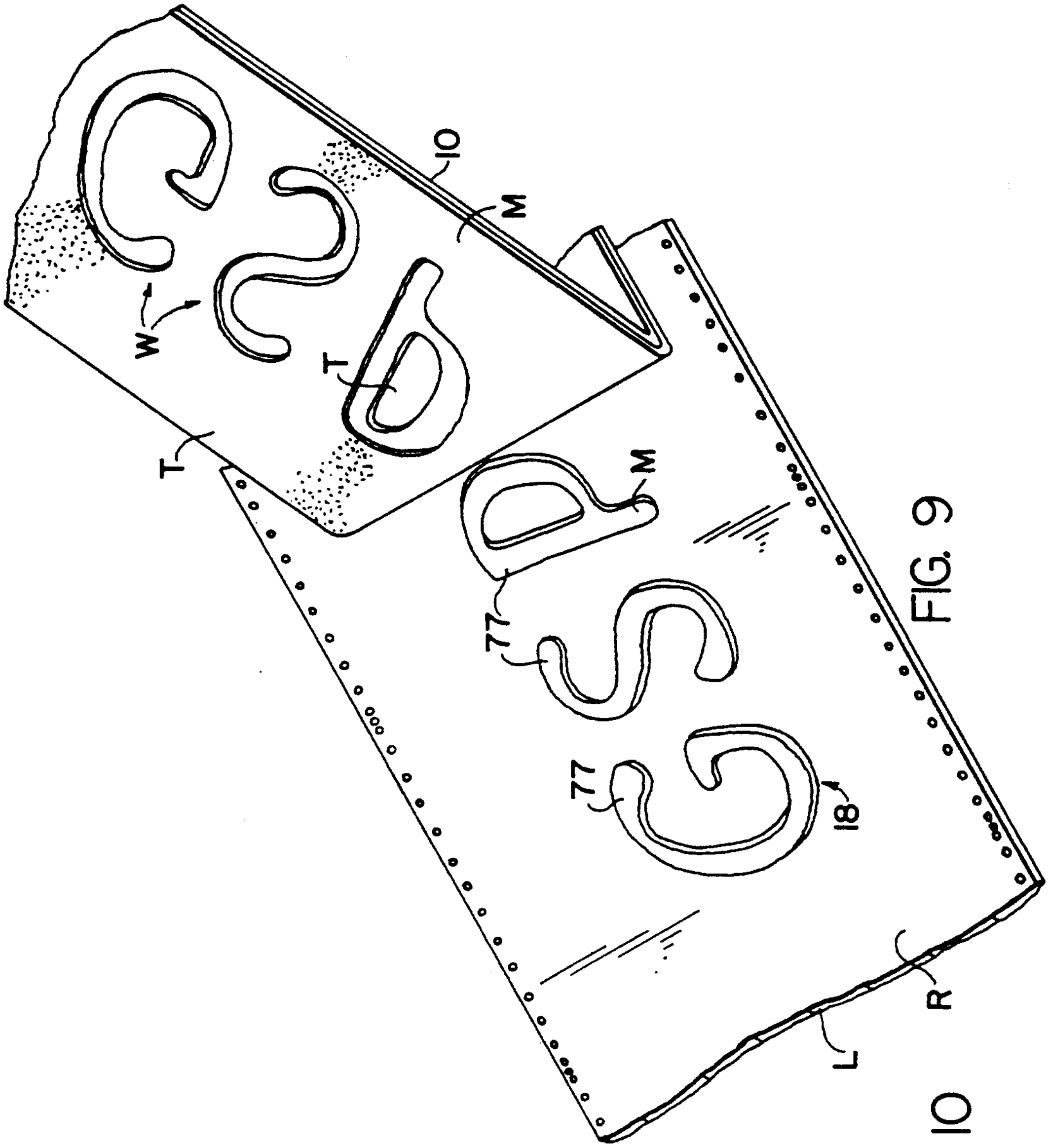
FIG. 9 is a view showing the automatic weeding of the sheet of sign material by the overlay sheet once bonded to it.

Referring now to FIG. 9 and to the final step in the automated weeding process, it should be seen that once the overlay sheet 10 becomes bonded to weed portions W of the sign material sheet M by the activated microcapsules C, automatic weeding of the graphic 18 from the sheet material can now be accomplished. As illustrated here, by pulling the overlay sheet 10 away from the liner sheet material L, the greater adhesive strength of the activated microcapsules C pulls the weed portions W of the underlying material layer M away with it against the less resistant pull strength of the permanently tacky adhesive T.

Figure 10:
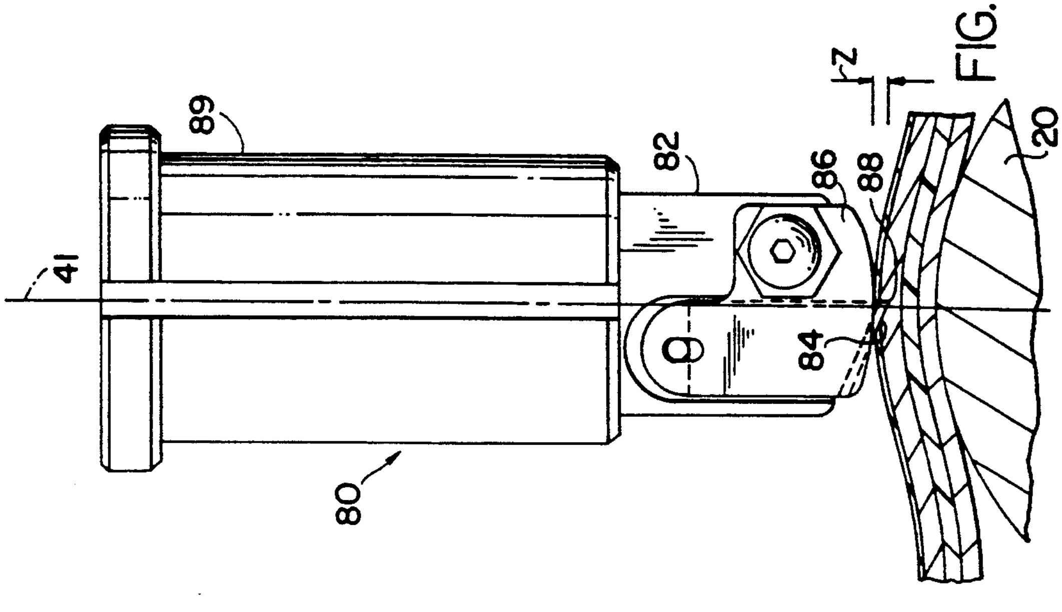
FIG. 10 is an alternative embodiment showing in side elevation view a knife and knife holder assembly including a fragmentary vertical section view of the material being bonded on the support roller.

FIG. 10 shows an alternative embodiment of the cutting tool which may be employed by the weeding system 1. Here, a combination pressure foot and knife holder assembly illustrated generally as 80 is used in place of the tool 72 thus avoiding the need to substitute the pressure tool 72 for the cutting implement 46. The assembly 80 is one such as disclosed in U.S. Pat. No. 4,732,069 issued to Wood et al. on Mar. 22, 1988 which patent being commonly assigned with the assignee of the present invention. As will be discussed in greater detail with reference to FIGS. 11*a*, 11*b*, the tool assembly 80 allows the graphic vectors stored in memory at step 104 to be recalled and used without alteration (step 114) to retrace the graphic 18 on the overlay sheet 10 thus mechanically creating the offset path 19.

The assembly 80 comprises a body portion 89 having a depending portion 82 carrying a knife 84 and a pressure foot 86 offset laterally relative to the knife 84. The tip 88 of the knife projects downwardly from the pressure foot 86 by approximately 0.004 to 0.005 inch as indicated by the dimension Z. Because the tip 88 of the knife does not penetrate through or even substantially through the overlay sheet 10, the pressure foot 86 can thus be used to activate the underlying microcapsules C without causing the sheet O to be unduly cut up as the tool assembly 80 makes its second pass (step 116).

Figure 11A:
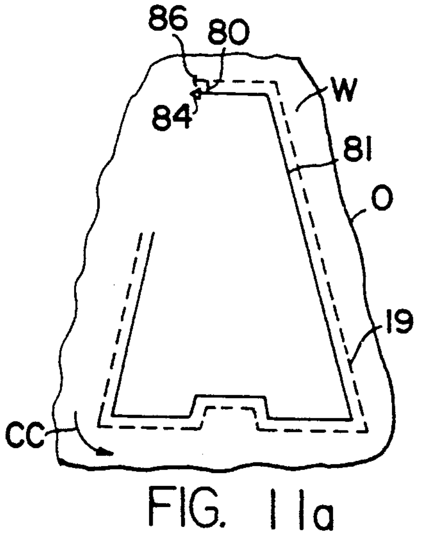
FIGS. 11*a* and 11*b* illustrate the orientation of the pressure foot relative to the knife during the second pass made by the assembly of FIG. 10.
Figure 11B:
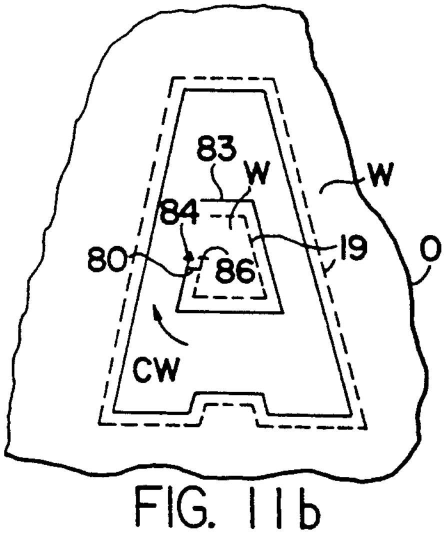

In FIGS. 11*a* and 11*b*, the presser foot 86 and the knife 84 are shown schematically as they are arranged on the tool assembly 80 in order to illustrate the positional relationship between these elements as the assembly 80 retraces the graphic 18 onto the overlay sheet O (step 116). As is shown in FIG. 11*a*, when tracing the outer perimeter of a shape, the assembly 80 is moved along a path 81 in a counterclockwise direction CC directly over the outer cut lines defining the graphic 18 such that the pressure foot 86 tracks along the outside edge of the shape. Conversely, as illustrated in FIG. 11*b*, when the tool 80 traces openings in closed shapes, such as in the case with the letter "O", it is moved in a clockwise direction CW along a path 83 directly above the cut lines defining the opening. This results in the pressure foot 86 being maintained inwardly of the path 83 thus activating the microcapsules C within the weed portion W defining the involved opening.

Figure 12:
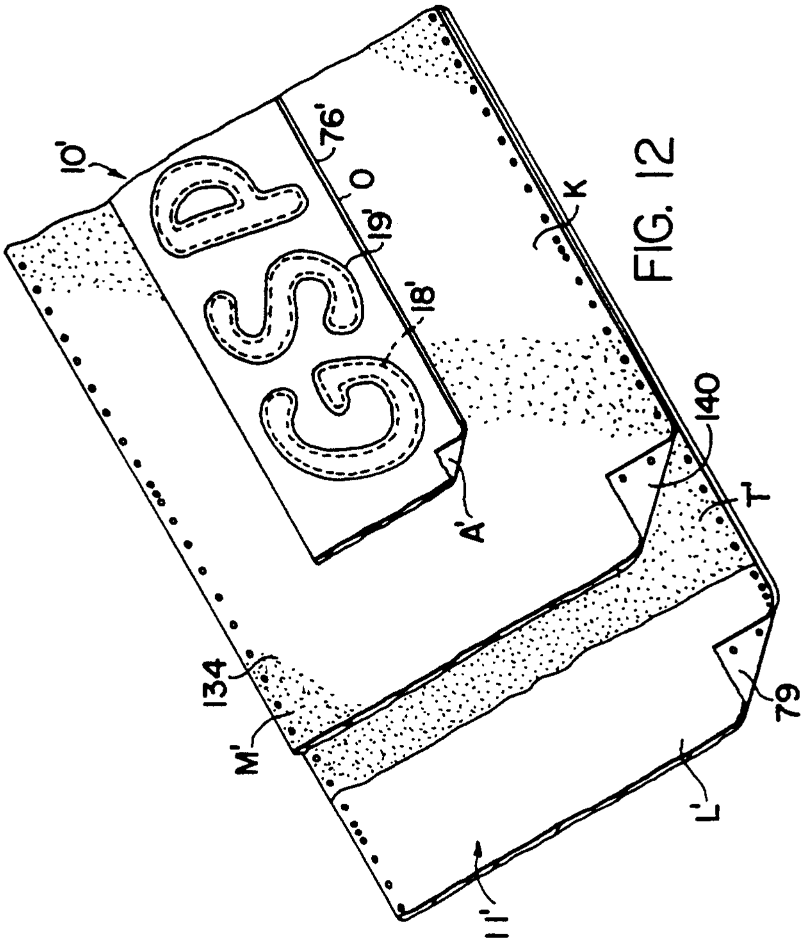
FIG. 12 is an alternative embodiment of the web of sign material in this case having the bonding material formed on its upper surface.
Figure 13:
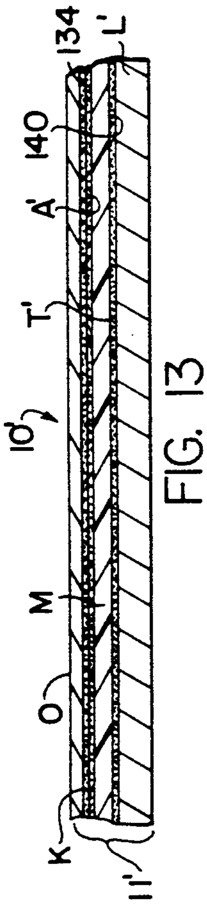
FIG. 13 is a sectional view through the web shown in FIG. 12.

Referring now to FIGS. 12 and 13, and to an alternate embodiment of a web employed by the system embodying the present invention, it should be seen that the web 11′ is comprised of a liner or base sheet L′ bonded to a modified sheet of sign material M′. The sign material sheet M′ has an upper surface 134 and an opposite lower surface 140 defining the good or the sign face of the sheet. Here, the liner sheet L′ has a layer of pressure sensitive or permanently tacky adhesive T′ bonded more strongly to it than to the sign surface 140 of the sign material sheet M′. Thus, the sign surface 140 serves as a release surface allowing the adhesive layer T′ to remain with the liner L′ when the sign material sheet M′ is pulled from it. Formed on the upper surface 134 of the sign material sheet M′ is a layer of dry activatable adhesive K capable of being selectively activated and subsequently bonded with the overlay sheet 10′. The dry activatable adhesive K may take the form of a number of different types of activatable adhesives. Most notably, the layer K is preferably a cured adhesive in which are embedded a plurality of crushable microcapsules of the type C disclosed with reference to FIG. 7 above. The web 11′ is preferably of the type disclosed in co-pending U.S. Ser. No. 056,458, entitled SIGN MAKING WEB WITH DRY ADHESIVE LAYER AND METHOD OF USING THE SAME filed on May 29, 1987 in the name of the same inventor of the present invention and being commonly assigned therewith.

In this embodiment, the graphic 18′ is cut into the sign material sheet M′ according to steps (100) through (102) discussed above. Since an activatable adhesive layer K is already bonded to the surface 134 of the sign material sheet M′, it is therefore not necessary to provide another such adhesive on the sheet O. However, the lower surface 76′ of the sheet O has a layer of tacky adhesive A′ for maintaining registration of the overlay sheet 10′ with the web 11′ once the adhesive layer A′ is placed down into contact on the dry adhesive surface K. Particularly well adapted for cutting and weeding of the graphic 18′ formed in the web 11′ is the replaceable tool arrangement of FIGS. 3 and 5. As previously discussed, the graphic 18′ is cut in the web 11′ by the cutting tool 46, thereafter replaced by the pressing implement 72. With the overlay sheet 10′ in place on the web 11′, the steps (110), (112) and (116) discussed previously with respect to FIG. 8 are then followed by the controller 7 causing the pressing tool 72 to be moved along the path 19′. This results in the weed portions W of the sign material sheet M′ becoming bonded to the overlay sheet O allowing them to be removed in accordance with the above-mentioned manner. Once removed, the sign material defining the cut graphic may then be applied directly to the sign surface using the base sheet L according to the method disclosed in the aforementioned copending U.S. application Ser. No. 056,458.

Figure 14:
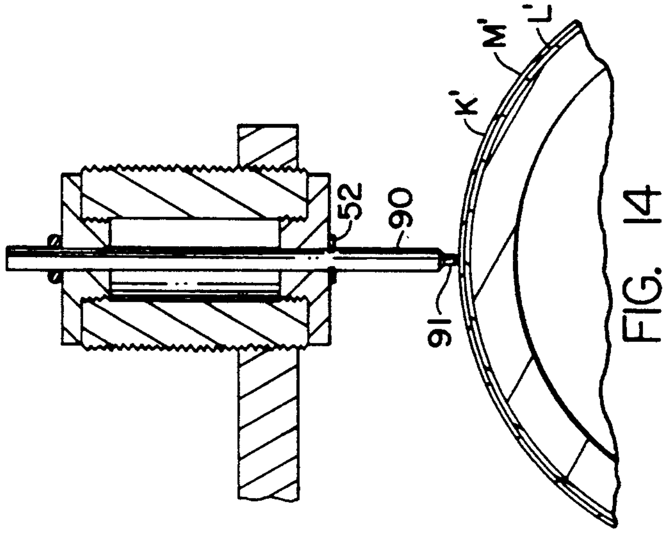
FIG. 14 is a side elevation view partially in section of an alternative embodiment showing a liquid applicator mounted in the support arm in place of the cutting tool of FIG. 3.

The dry activatable adhesive layer may alternatively take the form of an adhesive layer K′ capable of being transformed into a tacky state by applying a liquid to it. As shown in FIG. 14, an applicator 90 having a depending tip 91 is filled with a liquid tackifier and replaces the cutting tool 46 for this purpose. While the activatable adhesive layer K′ in this embodiment may take the form of a variety of different adhesives, the dry adhesive layer is preferably either rubber based or is water soluble. In the example where the adhesive layer K′ is water soluble, the applicator 90 is filled with a water based solution and in the example where the adhesive is rubber based, the applicator may be filled with a chemical tackifier, such as KODAFLEX Tx1B commercially made available by the Eastman Kodak Co., or other suitable activators, such as a di-2-ethyl hexyl phthalate solution.

The applicator 90 when applying the tackifier in the manner shown in FIG. 14 follows the offset path created within the controller 7 as described with reference to step 112 in FIG. 8. In this embodiment, the tip 91 of the applicator 90 directly contacts the adhesive layer K′ to activate it along underlying portions thereby forming a path 19′ of tacky adhesive adjacent the graphic 18′. With the weed now outlined by the path 19′, the overlay sheet O′ need only be comprised of a sheet of material, preferably paper, having a sufficient size to be placed over the graphic 18 to bond it with the weed portions of the sign material sheet M′ and to consequently allow the overlay sheet O to peel the weed portions from the liner L′ when the two sheets are pulled apart. For this, the adhesive layer K′ in its tacky condition possesses a greater per unit peel strength taken relative to that of the tacky adhesive layer T′ in accordance with the relative strengths set forth in table A-1 above.

In summary, it should be apparent from the foregoing that the automatic weeding system embodying the present invention employs the sign generating machine 12 and associated software for causing the holder 40 and the implement carried by it to be moved relative to the work surface 20 to not only cut a desired graphic into the web 11,11′, but also to selectively tackify portions of the bonding material 71 into an activated adhesive. An overlay sheet 10 is provided for cooperating with the tackified portions of the bonding means such that the weed portions of the web 11 become bonded to the overlay sheet 10 for subsequent removal by the user. Depending on the type of activatable adhesive which may comprise the bonding material 71, the overlay sheet 10 is either placed on the web 11 prior to the second pass made by a pressure tool as shown in FIG. 7, or may be placed on the web 11′ after the adhesive is activated, such as shown in FIG. 14 wherein the adhesive is liquid activated. Additionally, the holder 40 may either carry two separate tools, one for cutting the web and the other for subsequently activating the bonding material 71 as illustrated in FIGS. 5 and 6, or may carry a single tool which both cuts and activates without requiring tool replacement as is apparent from FIG. 10.

While the present invention has been described in the preferred embodiments, it should be understood that numerous modifications and substitutions can be made without departing from the spirit of the invention. For example, while in the present invention it is disclosed that the overlay sheet 10,10′ is used for removing the unwanted portions of the sign material sheet M,M′ by pulling material which surrounds the graphic off the liner sheet material, it is possible to alternatively reverse the offset path followed by the pressure foot or tool so that the text adheres to the overlay sheet rather than to the weed portion so that it can be lifted off the backing leaving the weed on the original liner. Furthermore, while in the preferred embodiment of the present invention, the microencapsulated adhesive C is disclosed as being the preferred bonding material, it is entirely within the scope of the invention to substitute other known adhesives for this, such as for example, a thermally activated adhesive activated to a tacky condition by a heating element carried by the tool holder 40. Additionally, the tool 72 may alternatively be an ultrasonic device moved along the overlay sheet in place on the sign material sheet to weld the two sheets together along a path.

Accordingly, the present invention has been described by way of illustration rather than limitation.

I claim:

1. A method of automatically weeding material in and around a graphic cut in web of sign material in sheet form, said method comprising:

providing a sign material sheet having an upper surface and an opposite lower surface with the lower surface of said sign material sheet being releasably attached to a base layer sheet by a layer of permanently tacky adhesive;

providing an automated cutting means having a tool means for cutting lines in said sign material sheet and having control means for causing the tool means to follow a given line of cut;

using said automated cutting means to cut lines in said sign material sheet to create a graphic;

providing an overlay sheet having an upper surface and an opposite lower surface;

placing said lower surface of said overlay sheet in contact with said upper surface of said sign material sheet after said sign material sheet has been cut;

selectively bonding portions of said cut sign material sheet to said overlay sheet using automated cutting means by using said control means to coordinate movement of the sign material sheet and overlay sheet relative to said tool means and to cause the tool means to follow an offset path over the upper surface of said overlay sheet along the graphic cut in the sign material sheet resulting in the selective bonding of the overlay sheet with the sign material sheet along said portions corresponding to the path followed by said tool means over said cover sheet; and pulling the overlay sheet away from the base layer sheet to separate the bonded portions of the sign material sheet from remaining sheet of sign material.

2. A method as defined in claim 1 wherein said step of bonding portions of said cut sign material sheet to said overlay sheet further includes the steps of providing bonding material capable of being activated along portions between a non-tacky state and a tacky state;

interposing said bonding material between said lower surface of said overlay sheet and said upper surface of said sign material sheet by placing said overlay sheet on said upper surface of said sign material sheet; and activating portions of said bonding material which are slightly offset from the cut lines defining the graphic formed in the sign material sheet using said automated means by using said tool means to apply pressure through said overlay sheet to underlying portions of said bonding means.

3. A method as defined in claim 1 wherein said control means in said automated means causes the tool means to automatically cut said graphic into said sign material sheet and subsequently stores the vectors used to cut said graphic; and utilizing said stored vectors to cause the tool means to move along a path slightly offset from the lines defining the graphic cut into the sign material sheet.

4. A method as defined in claim 3 wherein said bonding material is provided in the form of microencapsulated adhesive;

embedding said microencapsulated adhesive in a low tack adhesive layer and bonding it to said lower surface of said overlay sheet;

providing said tool means in the form of a pressing tool; and placing said pressing tool in contact with said upper surface of said overlay sheet to compress the encapsulated adhesive and activate portions of it into a tacky state.

5. A method as defined in claim 2 wherein said bonding material is comprised of microcapsules embedded within a layer of low tack adhesive formed on the lower surface of said overlay sheet.

6. A method as defined claim 4 wherein said layer of permanently tacky adhesive overlying said base layer sheet is bonded more strongly to said lower surface of said sign material sheet than to said base layer sheet;

providing said low tack adhesive layer of said overlay sheet with a first given peel strength;

providing said activated portions of said bonding material with a second peel strength which is substantially greater than said first given peel strength; and removing said sheet of sign material with said overlay sheet from said base layer sheet such that the cut graphic remains adhered to the base layer sheet while the remaining portions of the cut sign material sheet are adhered to the overlay sheet.

7. A method as defined in claim 1 wherein an advancing means is provided for initially receiving the base layer sheet and said sheet of sign material and for moving said sign material sheet relative to said tool means to cut the graphic into said sheet of sign material;

providing said lower surface of said overlay sheet with a permanently tacky low tack adhesive;

using said advancing means to subsequently hold the position of said sheet of sign material relative to said tool means and thereafter allow said overlay sheet with said permanently tacky low tack adhesive oriented toward said sheet of sign material onto the sheet of sign material for subsequent movement therewith by said advancing means relative to said tool means to effect bonding of said overlay sheet with the underlying portions of the cut sign material sheet.

8. A method as defined in claim 6 wherein an advancing means is provided for initially receiving said base layer sheet and said sheet of sign material and for moving the sign material sheet relative to said tool means to cut the graphic into said sheet of sign material;

providing the lower surface of said overlay sheet with a layer of permanently tacky low tack adhesive; and holding the position of said sheet of sign material relative to said tool means and thereafter placing said overlay sheet with said adhesive layer down in registration onto said sheet of sign material for subsequent movement therewith by said advancing means relative to said tool means to effect selective activization of said microencapsulated adhesive.

9. A method of automatically weeding from around and within a graphic formed in a sign material sheet having an upper and opposite lower surface, said method comprising:

providing an automated cutting means having a tool means for cutting lines in said sign material sheet and having control means for causing the tool means to follow a given line of cut;

providing bonding material in the form of a layer of dry activatable adhesive on said sign material upper surface;

providing a base layer sheet having an upper surface and an opposite lower surface;

releasably bonding said sign material sheet lower surface and said base layer sheet upper surface to one another;

providing the dry activatable adhesive with an activated state having a per unit peel strength which is substantially greater than the bond between said sign material sheet and said base layer;

cutting by said automated cutting means said sign material sheet using vectors in said control means to create a graphic and storing said vectors for subsequent use relative to a given datum;

providing applicator means as said tool means for selectively activating the activatable adhesive;

causing said applicator means to contact said layer of dry activatable adhesive after said cutting operation and to move along a path slightly offset from the cut lines defining said graphic to cause it to become tacky along the path as the result of said control means using said vectors to control the path of said applicator means relative to said datum;

providing an overlay sheet for covering said layer of activatable adhesive;

placing an overlay sheet onto said layer of activatable adhesive after said applicator means causes portions of said activatable adhesive layer to become tacky such that the activated adhesive bonds portions of the overlay sheet with portions of the sign material sheet; and peeling the sign material and overlay sheets from the base layer sheet to separate the cut graphic from the remaining portion of the sign material sheet.

10. A method as defined in claim 9 wherein said applicator means is a liquid applicator and said activatable adhesive is a dry adhesive responsive to the liquid dispensed from the applicator.

11. A method as defined in claim 10 wherein said overlay sheet being formed from a single sheet of paper.

12. A method of automatically weeding material in and around a graphic cut in web of sign material in sheet form, said method comprising;

providing a sign material sheet having an upper surface and an opposite lower surface with the lower surface of said sign material sheet being releasably attached to a base layer sheet by a layer of permanently tacky adhesive;

providing an automated cutting means having a tool means for cutting lines in said sign material sheet and having control means for causing the tool means to follow a given line of cut;

providing an overlay sheet having an upper surface and an opposite lower surface;

tool means having a knife blade with a depending tip and having a pressure foot offset therefrom;

providing said overlay sheet with a first given thickness and providing the tip of said knife with penetrable depth defining a second given distance taken relative said pressure foot; and selecting said first thickness to be greater than said second given distance such that said knife only partially cuts into the overlay sheet beyond said pressure foot;

and providing control means to cut lines in said sheet of sign material and using said data defining said cut lines to control the movement of said pressure foot over said overlay sheet.

13. A method as defined in claim 12 wherein said tool means is made to follow a path in a counterclockwise direction when outlining the outer perimeter of a closed shape; and said tool means being made to follow a path in a clockwise direction when tracing the inner perimeter of an opening formed within said closed shape.

14. A method as defined in claim 13 wherein the lower surface of said overlay sheet is embedded with a plurality of microcapsules capable of releasing a tacky adhesive when crushed.

15. A method as defined in claim 13 wherein one tool holder in said tool means is used to both cut the sheet of sign material to form the graphic and to hold a pressure tool to selectively bond the overlay sheet to corresponding underlying portions of the sign material sheet.

* * * * *